(12) United States Patent
Koo

(10) Patent No.: US 9,330,272 B2
(45) Date of Patent: May 3, 2016

(54) HEAD-MOUNTED DISPLAY APPARATUS WITH ENHANCED SECURITY AND METHOD FOR ACCESSING ENCRYPTED INFORMATION BY THE APPARATUS

(71) Applicant: Tae Eon Koo, Seoul (KR)

(72) Inventor: Tae Eon Koo, Seoul (KR)

(*) Notice: Subject to any disclaimer, the term of this patent is extended or adjusted under 35 U.S.C. 154(b) by 0 days.

(21) Appl. No.: 14/253,810

(22) Filed: Apr. 15, 2014

(65) Prior Publication Data

US 2014/0351896 A1    Nov. 27, 2014

(30) Foreign Application Priority Data

Apr. 16, 2013  (KR) .......................... 10-2013-0041673

(51) Int. Cl.
  *G06F 21/62* (2013.01)
  *G02B 27/01* (2006.01)
  *G06F 21/10* (2013.01)
  *G06F 21/32* (2013.01)
  *H04L 29/06* (2006.01)

(52) U.S. Cl.
  CPC .............. *G06F 21/62* (2013.01); *G02B 27/017* (2013.01); *G06F 21/10* (2013.01); *G06F 21/32* (2013.01); *H04L 63/0861* (2013.01); *G02B 2027/014* (2013.01); *G02B 2027/0138* (2013.01); *G02B 2027/0178* (2013.01)

(58) Field of Classification Search
  CPC ... H04L 63/0428; H04L 9/14; H04L 63/0838; H04L 63/0861; H04L 29/06; G06F 21/62; G06F 21/10; G06F 21/32; G06F 17/30; G06F 15/16; G02B 27/017
  USPC ........................................................... 726/4
  See application file for complete search history.

(56) References Cited

U.S. PATENT DOCUMENTS

2002/0101988 A1   8/2002  Jones
2003/0165240 A1*  9/2003  Bantz et al. ................... 380/54
2004/0192442 A1*  9/2004  Wells et al. ................... 463/36

(Continued)

FOREIGN PATENT DOCUMENTS

| AU | 2010201529 A1 | 12/2010 | |
| GB | EP1544704 A1 * | 12/2003 | ............... G06F 1/00 |
| JP | 2003143572 A | 5/2003 | |
| JP | 2007003745 A | 1/2007 | |

(Continued)

OTHER PUBLICATIONS

European Search report, Appl. # EP14164671.1, dated Jul. 29, 2014.

*Primary Examiner* — Harunur Rashid
*Assistant Examiner* — Sakinah Taylor
(74) *Attorney, Agent, or Firm* — Hauptman Ham, LLP

(57) ABSTRACT

There are provided a head-mounted display (HMD) apparatus and a method for accessing encrypted information by the apparatus, in which the head-mounted display apparatus with enhanced security according to an embodiment of the present invention includes a biometric information input unit that receives biometric information of a user; a communication module that transmits or receives information to or from a server; a memory that stores encrypted information; a processor that transmits the biometric information received through the biometric information input unit to a user authentication server through the communication module, receives access privilege information from the user authentication server, and decrypts the encrypted information stored in the memory based on the received access privilege information; and a display unit that displays the decrypted information through the processor.

10 Claims, 6 Drawing Sheets

(56) References Cited

U.S. PATENT DOCUMENTS

| | | | |
|---|---|---|---|
| 2006/0078176 A1* | 4/2006 | Abiko et al. | 382/124 |
| 2009/0214033 A1* | 8/2009 | Nakagata et al. | 380/243 |
| 2010/0061553 A1 | 3/2010 | Chaum | |
| 2012/0324234 A1* | 12/2012 | Hamid et al. | 713/183 |
| 2013/0081119 A1* | 3/2013 | Sampas | 726/7 |
| 2015/0219902 A1 | 8/2015 | Kim et al. | |

FOREIGN PATENT DOCUMENTS

| | | |
|---|---|---|
| JP | 2007006393 | 1/2007 |
| JP | 2010092442 A | 4/2010 |
| JP | 2012221210 A | 11/2012 |
| WO | 2007014790 A1 | 2/2007 |
| WO | 2009004498 | 1/2009 |
| WO | 2015053449 A1 | 4/2015 |

* cited by examiner (a)

(b)

(c)

(d)

HEAD-MOUNTED DISPLAY APPARATUS WITH ENHANCED SECURITY AND METHOD FOR ACCESSING ENCRYPTED INFORMATION BY THE APPARATUS

CROSS-REFERENCE TO RELATED APPLICATIONS

This application claims the priority of Korean Patent Application No. 2013-0041673 filed on Apr. 16, 2013, in the Korean Intellectual Property Office, the disclosure of which is incorporated herein by reference.

BACKGROUND OF THE INVENTION

1. Field of the Invention

The present invention relates to a head-mounted display (HMD) apparatus with enhanced security and a method for accessing encrypted information by the apparatus, and more particularly, to a method for accessing encrypted information by obtaining biometric information by a head-mounted display (HMD) apparatus with enhanced security.

2. Description of the Related Art

As technology advances, mobile terminals such as a cellular phone, PDA (Personal Digital Assistance) and a smart phone is miniaturized, and portability of the mobile terminal is maximized. Thus, in addition to the miniaturization and reducing weight of the product, wearable devices that can be worn on a body of a human have been recently deployed on a commercial scale.

Among the wearable devices, there is a rising interest on a head-mounted display apparatus in the form of glasses or a helmet that can be applied to a virtual reality system or an augmented reality system.

In the case of a general head-mounted display apparatus, a user can see an image through a display unit including a micro display, a curved display, a flexible display or a transparent display. At this time, only the user wearing the head-mounted display apparatus can easily see the image. Accordingly, the user wearing the head-mounted display apparatus can check desired information without being peeped by other person.

However, since anyone wearing the head-mounted display apparatus can see the image, when a content requiring security is displayed, there may occur a problem. Accordingly, it is required that the head-mounted display apparatus identifies the user and only the user whose credential is verified can access the content requiring security.

As a user authentication method for identifying the user to verify the credential of the user, there is a general and simple method using a combination of an account and a password. Although the method can identify the user by performing a DB matching process on the account and the password, in the method, the account and the password may be illegally used, and may not easily input.

Accordingly, there is a need for development of an apparatus and a method capable of effectively preventing information from being stolen or illegally used by a third party in accessing the information through the head-mounted display apparatus.

SUMMARY OF THE INVENTION

An object of the present invention is to provide a head-mounted display apparatus with enhanced security capable of authenticating a user by using biometric information.

Another object of the present invention is to provide a head-mounted display apparatus with enhanced security capable of being simply used for many users while maintaining security by authenticating a user at the outside by using biometric information.

Still another object of the present invention is to provide a head-mounted display apparatus with enhanced security capable of decrypting encrypted information by authenticating a user at the outside by using biometric information.

The objects of the present invention are not limited to the aforementioned objects, and other objects, which are not mentioned above, will be apparent to those skilled in the art from the following description.

In order to solve the above objects, the head-mounted display apparatus with enhanced security according to an embodiment of the present invention includes a biometric information input unit that receives biometric information of a user; a communication module that transmits or receives information to or from a server; a memory that stores encrypted information; a processor that transmits the biometric information received through the biometric information input unit to a user authentication server through the communication module, receives access privilege information from the user authentication server, and decrypts the encrypted information stored in the memory based on the received access privilege information; and a display unit that displays the decrypted information through the processor.

According to another characteristic of the present invention, the encrypted information is received from an information providing server through the communication module.

According to still another characteristic of the present invention, the head-mounted display apparatus with enhanced security further includes a camera, wherein a scene captured by the camera is stored in the memory, as image information, and the encrypted information is recognized from the image information.

According to still another characteristic of the present invention, the biometric information input unit is an iris camera that receives iris information of the user.

According to still another characteristic of the present invention, the biometric information input unit is positioned at an upper side of the display unit.

According to still another characteristic of the present invention, the access privilege information includes a decryption key that is able to decrypt the encrypted information.

According to still another characteristic of the present invention, the biometric information is information obtained by combining the biometric information received through the biometric information input unit with unique identification information of the apparatus.

In order to solve the above objects, a method for accessing encrypted information by a head-mounted display apparatus with enhanced security according to an embodiment of the present invention includes receiving biometric information of a user through a biometric information input unit; transmitting the biometric information received through the biometric information input unit to a user authentication server; receiving access privilege information from the user authentication server; decrypting encrypted information stored in a memory based on the access privilege information; and displaying the decrypted information of the encrypted information on a display unit.

According to another characteristic of the present invention, the encrypted information is received from an information providing server.

According to still another characteristic of the present invention, a method for accessing encrypted information by a head-mounted display apparatus with enhanced security further includes storing a scene captured by a camera in the memory, as image information, wherein in the decrypting, the encrypted information is recognized from the image information to decrypt the recognized information.

According to still another characteristic of the present invention, the biometric information is iris information.

According to still another characteristic of the present invention, in the decrypting, the encrypted information is selectively decrypted.

According to still another characteristic of the present invention, the access privilege information includes a decryption key that is able to decrypt the encrypted information.

According to still another characteristic of the present invention, the biometric information is information obtained by combining the biometric information received through the biometric information input unit with unique identification information of the apparatus.

The detailed contents of other embodiments are included in the detailed description and drawings.

According to exemplary embodiments of the present invention, it is possible to enhance security of a head-mounted display apparatus by authenticating a user by using biometric information.

According to exemplary embodiments of the present invention, in a head-mounted display apparatus with enhanced security, by authenticating a user through an external DB by using biometric information, it is possible to authenticate a user through another device without being limited to a specific device.

According to exemplary embodiments of the present invention, by decrypting information encrypted by a head-mounted display apparatus with enhanced security, even though the encrypted information is exposed, it is possible to prevent the information from being decrypted.

The effects of the present invention are not limited to the aforementioned effects, and various effects are included in the present specification.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
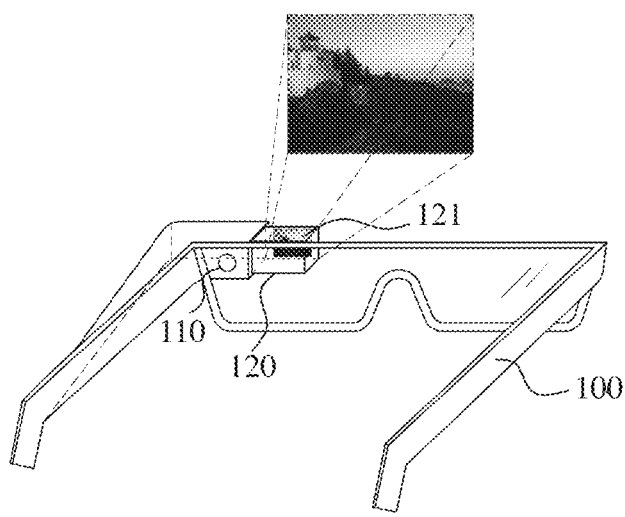
FIG. 1 is a configuration diagram of a head-mounted display apparatus with enhanced security according to an exemplary embodiment of the present invention.

Various advantages and features of the present invention and methods accomplishing thereof will become apparent from the following description of embodiments with reference to the accompanying drawings. However, the present invention is not limited to exemplary embodiment disclosed herein but will be implemented in various forms. The exemplary embodiments are provided by way of example only so that a person of ordinary skilled in the art can fully understand the disclosures of the present invention and the scope of the present invention. Therefore, the present invention will be defined only by the scope of the appended claims.

Although first, second, and the like are used in order to describe various components, the components are not limited by the terms. The above terms are used only to discriminate one component from the other component. Therefore, a first component mentioned below may be a second component within the technical spirit of the present invention.

The same reference numerals indicate the same elements throughout the specification.

In the drawings, size and thickness of each element are arbitrarily illustrated for convenience of description, and the present invention is not necessarily limited to those illustrated in the drawings.

For the specification, when any one element transmits data or signal to other elements, it means that the elements can directly transmit the data or signal to other elements or can transmit the data or signal to other elements through another element.

An encryption method of information includes a symmetric encryption method, an asymmetric encryption method, an encrypted signature, and an encrypted hash. Among them, the symmetric encryption method is a method that encrypts information by using an encryption key so as not to allow a third party to read the information and decrypts the encrypted information by using the same decryption key as the encryption key. Accordingly, a transmission side and a reception side need to use the same key in order to encrypt and decrypt the information and to transmit or share the key in a safe transmission method. For convenience in description, although it will be described in the present specification that the symmetric encryption method is used in encrypting or decrypting the encrypted information, the present invention is not limited thereto. Various methods including the symmetric encryption method may be used in encrypting or decrypting the encrypted information, and biometric information may be used.

Hereinafter, various exemplary embodiments of the present invention will be described in detail with reference to the accompanying drawings.

FIG. 1 is a configuration diagram of a head-mounted display apparatus with enhanced security according to an exemplary embodiment of the present invention.

Referring to FIG. 1, a head-mounted display apparatus with enhanced security 100 according to an exemplary embodiment of the present invention may include a biometric information input unit 110, a communication module, a processor, a memory, and a display unit 120.

The head-mounted display apparatus with enhanced security 100 according to the exemplary embodiment of the present invention is an apparatus that receives biometric information of a user, and decrypts information encrypted through a user authentication process by using the biometric information to display the decrypted information to the user. Although it has been illustrated in FIG. 1 that the head-mounted display apparatus with enhanced security 100 is implemented as glasses, the present invention is not limited thereto. The head-mounted display apparatus with enhanced security may be implemented as a helmet, safety glasses, and goggles. The configuration of the apparatus will be described below.

In the head-mounted display apparatus with enhanced security 100 according to the exemplary embodiment of the present invention, the biometric information input unit 110 receives biometric information from eyes of the user. The biometric information input unit 110 may be a retina camera that receives retinal information or an iris camera that receives iris information. The iris camera can receive the biometric information from the user even though a living body does not touch the unit.

Particularly, since the irises of a human does not grow any more after 18 months of life, the iris is not changed. Accordingly, since shapes of irises have different features for individuals like fingerprints, recognition of the iris through the iris camera can be used as an authentication technology for security. The iris camera adjusts a focus of the eye of the user by using an infrared filter to image the iris of the user as a photograph. Further, a brightness pattern of the iris is analyzed for each region, and an individual unique code is generated. At this time, in order to increase a recognition rate of the iris, image processing in which zoom-out, zoom-in, level values for channels, contrast values for channels, brightness, hue or saturation is adjusted may be performed on an iris image.

In the head-mounted display apparatus with enhanced security 100 according to the exemplary embodiment of the present invention, the communication module transmits information to a server through a communication network, or receives information from the server. Through the communication module, the biometric information received through the biometric information input unit 110 is transmitted to a user authentication server, and receives access privilege information from the user authentication server.

The biometric information may mean biometric information itself, or may mean information obtained by converting the biometric information through a certain algorithm in order to prevent side effects caused by which the biometric information is stolen or illegally used. The reason why the information obtained by converting the biometric information through a certain algorithm is used is because when the biometric information of the user is stolen or is illegally used, uniqueness and invariability of the biometric information may adversely cause serious invasion of privacy. That is, in a general user authentication method using an account and password, when the account and password are stolen or illegally used, the problem may be solved by reissuing a new account and password. However, it is difficult to generate new biometric information.

Furthermore, the information obtained by converting the biometric information through a certain algorithm may be information obtained by combining biometric information with unique identification information of the head-mounted display apparatus with enhanced security 100 through a certain algorithm. The unique identification information means unique information that is given to each head-mounted display apparatus with enhanced security to identify the apparatus.

The user authentication server includes a DB for storing information that may be matched to the biometric information of the user. The user authentication server performs a DB matching process on the biometric information received from the head-mounted display apparatus with enhanced security 100, and transmits access privilege information to the head-mounted display apparatus with enhanced security 100 that has transmitted the biometric information when the identified user is authenticated.

Moreover, the user authentication server may include a DB for storing information that may be matched to the unique identification information of the head-mounted display apparatus with enhanced security 100 in addition to the DB for storing information that may be matched to the biometric information of the user. The user authentication server performs the DB matching process on the obtained unique identification information of the head-mounted display apparatus with enhanced security 100. As a result, when the identified apparatus 100 is authenticated, the user authentication server may transmit the access privilege information to the head-mounted display apparatus with enhanced security 100 that has transmitted the biometric information. Accordingly, since the user authentication server identifies and authenticates both the head-mounted display apparatus with enhanced security 100 and the user of the apparatus 100, security can be further enhanced.

The access privilege information basically means information on a privilege allowing the head-mounted display apparatus with enhanced security 100 to decrypt encrypted information stored in the memory.

A decryption key may be included in the access privilege information. The decryption key means a series of information units that can decrypt the encrypted information. Accordingly, even when the apparatus does not include the decryption key that decrypts the encrypted information, the head-mounted display apparatus with enhanced security 100 that has received the access privilege information may decrypt the encrypted information by using the decryption key included in the access privilege information.

Figure 5:
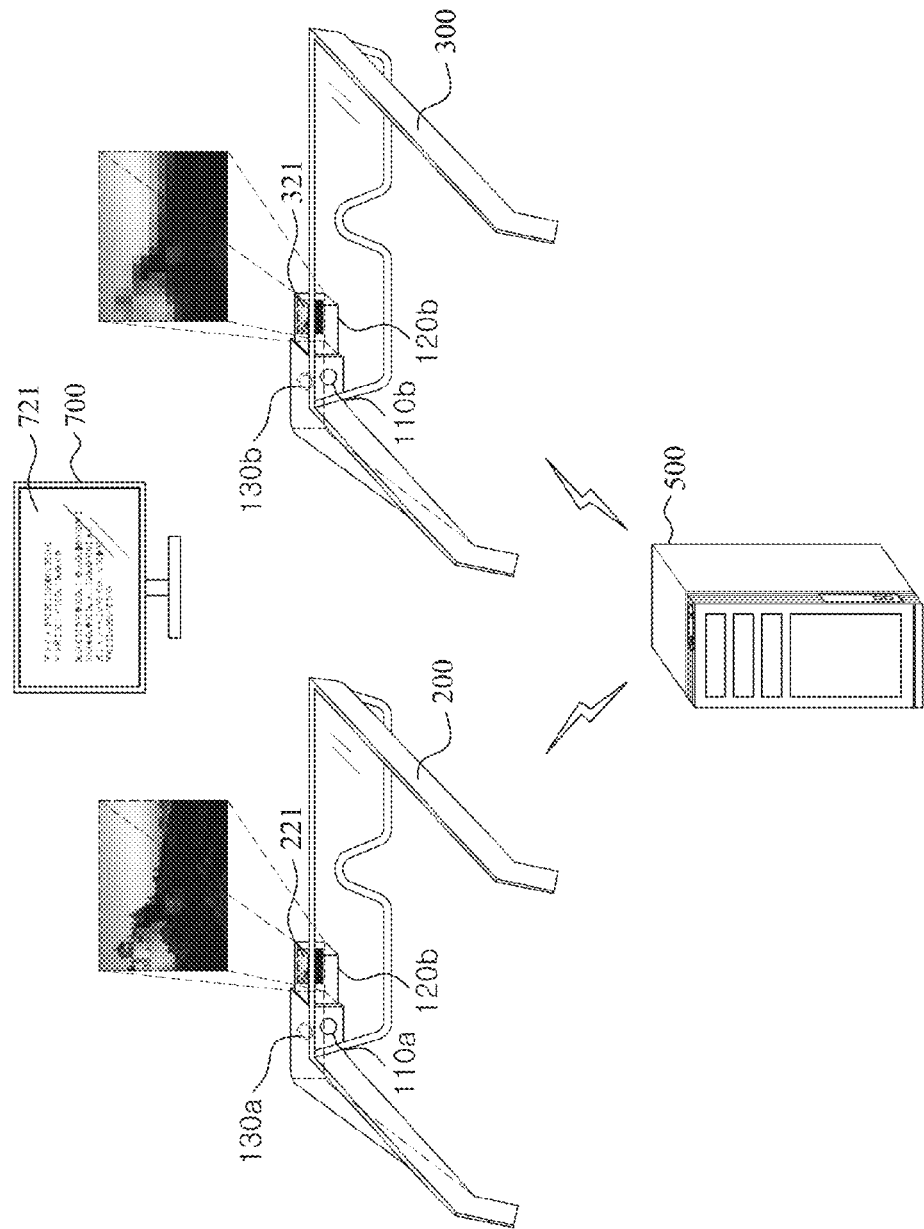
FIG. 5 is a configuration diagram of a system for accessing encrypted information by a head-mounted display apparatus with enhanced security according to an exemplary embodiment of the present invention.

At this time, since the user authentication server adds different decryption keys from each other depending on users identified by biometric information to the access privilege information, decrypted information of the encrypted information may be different depending on the head-mounted display apparatus with enhanced security 100 that has transmitted the biometric information, and the description thereof will be presented in detail with reference to FIG. 5.

The unique identification information of the head-mounted display apparatus with enhanced security 100 may be included in the access privilege information. Accordingly, the head-mounted display apparatus with enhanced security 100 that has received the access privilege information may determine whether or not the unique identification information of the apparatus 100 coincides with the unique identification information included in the access privilege information, and may control whether to decrypt the encrypted information. Since the unique identification information of the head-mounted display apparatus with enhanced security 100 is included in the access privilege information, only the apparatus 100 having the unique identification information coinciding with the unique identification information included in the access privilege information can decrypt the encrypted information, so that it is possible to prevent the encrypted information from being decrypted by a third party by preventing the access privilege information from being stolen by the third party during communication.

In the head-mounted display apparatus with enhanced security 100 according to the exemplary embodiment of the present invention, the processor may control components and perform various operations by using the received information. The processor decrypts the encrypted information stored in the memory depending on the access privilege information received through the communication module.

According to the exemplary embodiment of the present invention, when the head-mounted display apparatus with enhanced security 100 includes the decryption key that can decrypt the encrypted information, the encrypted information can be decrypted using the decryption key.

According to another exemplary embodiment of the present invention, when the head-mounted display apparatus with enhanced security 100 does not include the decryption key that can decrypt the encrypted information, the head-mounted display apparatus with enhanced security 100 can decrypt the encrypted information by using the access privilege information including the decryption key.

According to the exemplary embodiment of the present invention, when the unique identification information of the head-mounted display apparatus with enhanced security 100 is included in the access privilege information, the processor of the head-mounted display apparatus with enhanced security 100 that has received the access privilege information may determine whether or not the unique identification information of the apparatus 100 coincides with the unique identification information included in the access privilege information, and may control whether to decrypt the encrypted information.

In the head-mounted display apparatus with enhanced security 100 according to the exemplary embodiment of the present invention, the memory stores data such as information or commands required by the processor that executes operations. The memory may be a buffer memory that temporarily stores the encrypted information, and the encrypted information may be stored until the encrypted information is decrypted to be displayed. When the encrypted information is temporarily stored in the memory, since the encrypted information is not remained in the memory after the encrypted information is decrypted to be displayed, it is possible to fundamentally prevent the third party from accessing the encrypted information. Meanwhile, the encrypted information may be previously stored in the memory, but may be received from an information providing server or may be obtained from image information generated by a camera. A system in which the encrypted information is received from the information providing server will be described below with reference to FIG. 3. Meanwhile, a configuration in which the encrypted information is obtained from the image information generated by the camera will be described below with reference to FIG. 4.

In the head-mounted display apparatus with enhanced security 100 according to the exemplary embodiment of the present invention, the display unit 120 includes a micro display so as to allow the eyes of the user to see the displayed information on the display unit 120, and displays the information under the control of the processor. The display unit may be a transparent display unit so as to secure external visibility. The display unit 120 displays decrypted information 121 of the encrypted information through the processor.

Since only the user wearing the head-mounted display apparatus with enhanced security 100 can see a screen displayed on the display unit 120, the decrypted information 121 of the encrypted information is not seen by other person, so that, it is possible to further enhance security.

Figure 2:
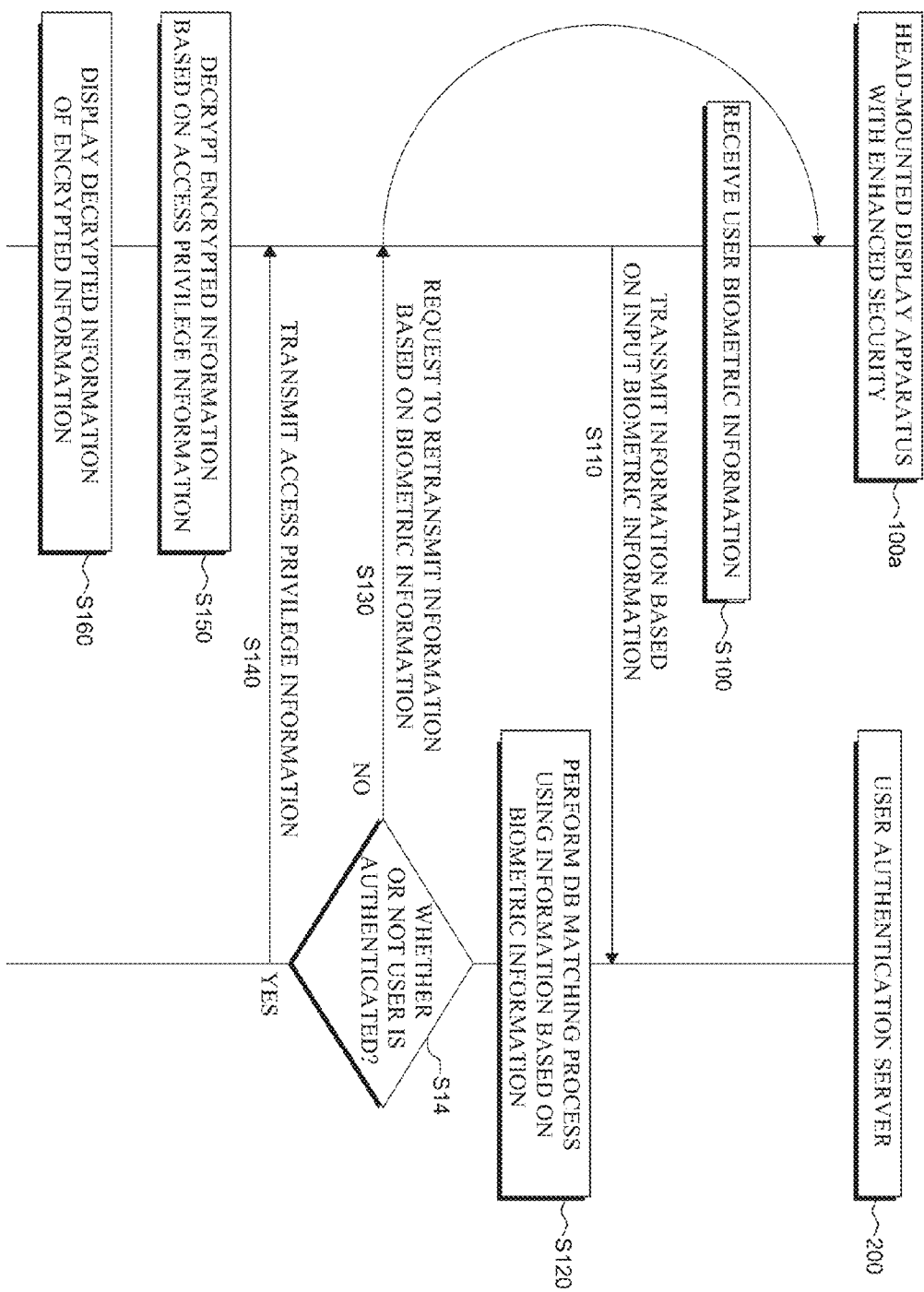
FIG. 2 is a flowchart of a method for accessing encrypted information by a head-mounted display apparatus with enhanced security according to an exemplary embodiment of the present invention.

FIG. 2 is a flowchart of a method for accessing encrypted information by a head-mounted display apparatus with enhanced security according to an exemplary embodiment of the present invention. For convenience in description, the description will be presented with reference to FIG. 1.

Firstly, the biometric information of the user is input through the biometric information input unit 110 of the head-mounted display apparatus with enhanced security 100 (S100).

The biometric information may be biometric information that can be obtained from the eye of the user, and may be retina information or iris information.

When the biometric information of the user is input, the input biometric information is transmitted through the communication module of the head-mounted display apparatus with enhanced security 100 to the user authentication server (S110).

At this time, the biometric information may mean biometric information itself, or may mean information obtained by converting the biometric information through a certain algorithm. Further, the information obtained by converting the biometric information through a certain algorithm may be information obtained by combining the biometric information with the unique identification information of the head-mounted display apparatus with enhanced security 100 through a certain algorithm.

When the biometric information is transmitted to the authentication server, the user authentication server performs the DB matching process on the biometric information in order to authenticate the user (S120).

As a result of performing the DB matching process on the obtained biometric information by the user authentication server, when the user is not identified or it is determined that the identified user is not an authenticated user, the user authentication server may request retransmission of the biometric information to the head-mounted display apparatus with enhanced security 100 that has transmitted the biometric information (S130), or may end communication with the apparatus 100. When the head-mounted display apparatus with enhanced security 100 is requested to retransmit the biometric information from the user authentication server, the head-mounted display apparatus with enhanced security 100 may receive the biometric information of the user again (S110), and may transmit the received biometric information to the user authentication server (S120).

Meanwhile, as the result of performing the DB matching process on the obtained biometric information by the user authentication server, when the user is authenticated, the user authentication server transmits the access privilege information to the head-mounted display apparatus with enhanced security 100 that has transmitted the biometric information (S140).

Meanwhile, when the biometric information is the information obtained by converting the biometric information through a certain algorithm and the information obtained by combining the biometric information with the unique identification information of the apparatus 100 through a certain algorithm, the user authentication server may obtain the biometric information and the unique identification information of the apparatus 100 by using the algorithm used to combine the biometric information and the unique identification information of the apparatus 100, and may perform the DB matching process on the obtained unique identification information. As a result of performing the DB matching process on the unique identification information of the apparatus 100 by the user authentication server, when the apparatus 100 is not identified or it is determined that the identified apparatus is not an authenticated apparatus, the user authentication server may request the retransmission of the biometric information to the apparatus 100 or may end communication with the apparatus 100 as in step S130 described above. Meanwhile, as the result of performing the DB matching process on the unique identification information of the apparatus 100 by the user authentication server, when the apparatus 100 is authenticated, the user authentication server may transmit the access privilege information to the apparatus 100 as in step S140 described above.

Accordingly, since the user authentication server identifies and authenticates both the head-mounted display apparatus with enhanced security 100 and the user of the apparatus 100, it is possible to further enhance security.

When the access privilege information is received through the communication module of the head-mounted display apparatus with enhanced security 100, the encrypted information stored in the memory is decrypted through the processor of the head-mounted display apparatus with enhanced security 100 (S150).

The encrypted information may be previously stored in the memory, but may be received from an information providing server 600, or may be obtained from image information generated by a camera. A method for accessing the encrypted information received from the information providing server 600 will be described below with reference to FIG. 3. Meanwhile, a method for accessing the encrypted information through the image information generated by the camera will be described below with reference to FIG. 4.

According to the exemplary embodiment of the present invention, when the head-mounted display apparatus with enhanced security 100 includes the decryption key that can decrypt the encrypted information, the encrypted information can be decrypted using the decryption key.

According to another exemplary embodiment of the present invention, when the head-mounted display apparatus with enhanced security 100 does not include the decryption key that can decrypt the encrypted information, the head-mounted display apparatus with enhanced security 100 can decrypt the encrypted information by using the access privilege information including the decryption key.

When the encrypted information is decrypted, the decrypted information 121 is displayed on the display unit 120 of the head-mounted display apparatus with enhanced security 100 (S160).

Figure 3:
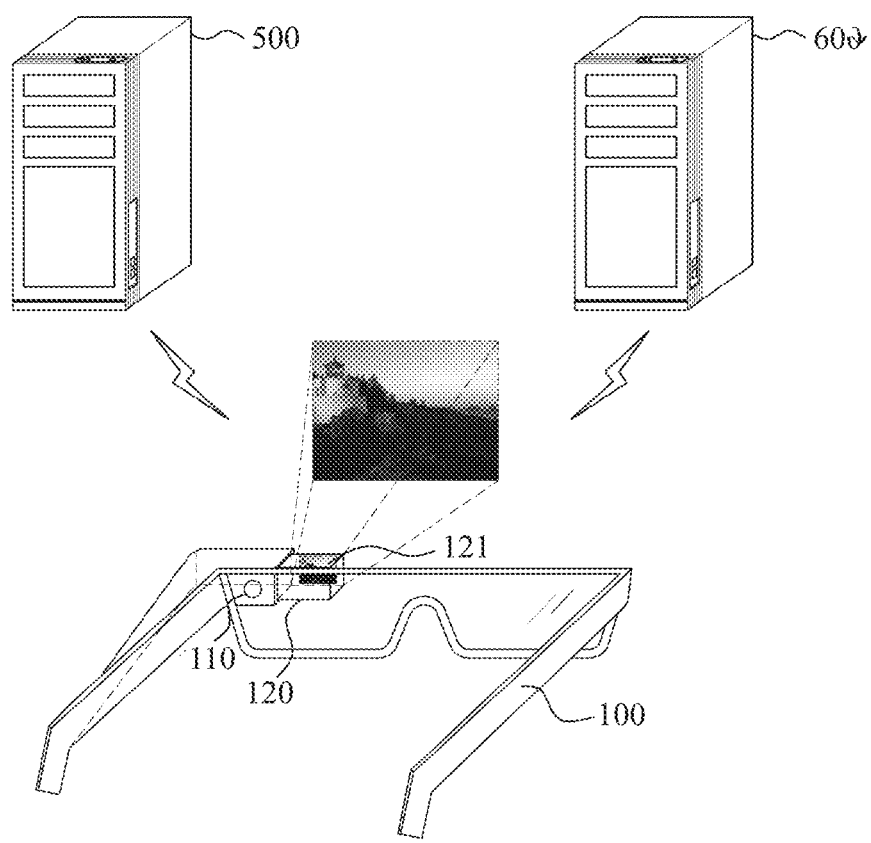
FIG. 3 is a configuration diagram of a system for accessing encrypted information by a head-mounted display apparatus with enhanced security according to an exemplary embodiment of the present invention.

FIG. 3 is a configuration diagram of a system for accessing encrypted information by a head-mounted display apparatus with enhanced security according to an exemplary embodiment of the present invention.

Referring to FIG. 3, the system for accessing encrypted information by a head-mounted display apparatus with enhanced security may include a head-mounted display apparatus with enhanced security 100, a user authentication server 500, and an information providing server 600.

As illustrated in FIG. 3, the user authentication server 500 and the information providing server 600 may be configured as separate servers, or may be configured as one server.

According to the exemplary embodiment of the present invention, the head-mounted display apparatus with enhanced security 100 may request transmission of the encrypted information to the information providing server 600, and the head-mounted display apparatus with enhanced security 100 may request the transmission of the encrypted information to the information providing server 600 before the biometric information of the user is input to the head-mounted display apparatus with enhanced security 100.

Accordingly, when the head-mounted display apparatus with enhanced security 100 receives the encrypted information by requesting the transmission of the encrypted information to the information providing server 600 before the biometric information of the user is input, the received encrypted information is stored in the memory of the head-mounted display apparatus with enhanced security 100. Moreover, the encrypted information stored in the memory is not decrypted until the head-mounted display apparatus with enhanced security 100 receives the access privilege information from the user authentication server 500.

According to the exemplary embodiment of the present invention, the head-mounted display apparatus with enhanced security 100 may request the transmission of the encrypted information to the information providing server 600 after the head-mounted display apparatus with enhanced security 100 receives the access privilege information from the user authentication server 500. Accordingly, when the head-mounted display apparatus with enhanced security 100 receives the access privilege information from the user authentication server 500 and receives the encrypted information by requesting the transmission of the encrypted information to the information providing server 600, the received encrypted information is stored in the memory, and the encrypted information stored in the memory from the user authentication server 500 is decrypted based on the received access privilege information.

When the encrypted information is decrypted, the decrypted information 121 is displayed on the display unit 120 of the head-mounted display apparatus with enhanced security 100.

As stated above, according to the system for accessing the encrypted information by using the head-mounted display apparatus with enhanced security 100 and the information providing server 600, the user wearing the head-mounted display apparatus with enhanced security 100 can check the decrypted information of the encrypted information at a remote site.

Meanwhile, the encrypted information may belong to one of layers. Information belonging to different layers from each other may be decrypted depending on authenticated users, and the decrypted information may be displayed. Accordingly, different information may be displayed depending on users or security levels of information, so that it is possible to allow only the authenticated user to browse data requiring security.

Figure 4:
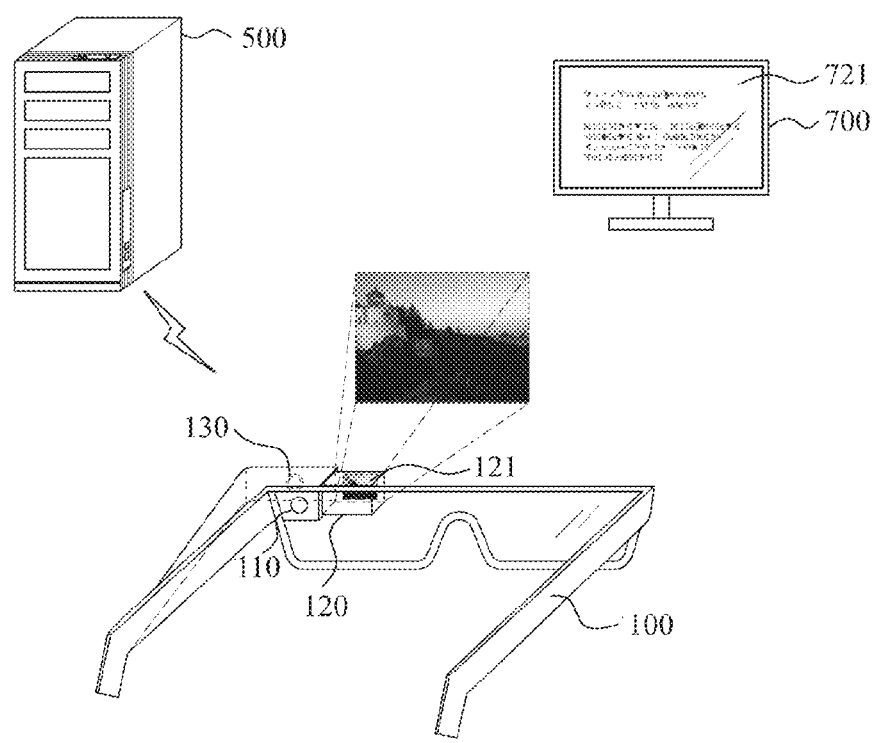
FIG. 4 is a configuration diagram of a system for accessing encrypted information by a head-mounted display apparatus with enhanced security according to an exemplary embodiment of the present invention.

FIG. 4 is a configuration diagram of a system for accessing encrypted information by a head-mounted display apparatus with enhanced security according to an exemplary embodiment of the present invention.

Referring to FIG. 4, the system for accessing encrypted information by a head-mounted display apparatus with enhanced security may include a head-mounted display apparatus with enhanced security 100, a user authentication server 500, and an external display apparatus 700, and the head-mounted display apparatus with enhanced security 100 may further include a camera 130 for capturing an external scene.

The head-mounted display apparatus with enhanced security 100 may store a scene captured by the camera 130 in the memory, as image information, and may obtain the encrypted information from the image information stored in the memory. Referring to FIG. 4, when an encrypted character string is displayed on a screen of the external display apparatus 700, the encrypted character string may be included in the image information generated by capturing a screen 721 on which the encrypted character string is displayed. Accordingly, since the head-mounted display apparatus with enhanced security 100 recognizes the encrypted character string from the image information by an OCR (Optical Character Recognition) process, the encrypted information can be obtained. At this time, a certain sign may be displayed on the screen 721 on which the encrypted character string is displayed so as to allow the head-mounted display apparatus with enhanced security 100 to easily recognize the encrypted character string from the image information through the OCR process. An example of the sign displayed on the screen 721 on which the encrypted character string is displayed may include a marker displayed on a corner of the screen. When no sign is displayed on the screen 721 on which the encrypted character string is displayed, since the head-mounted display apparatus with enhanced security 100 may not specify a boundary of the encrypted character string within the image information, noise may occur in the OCR process.

According to the exemplary embodiment of the present invention, the encrypted information may be obtained from the image information generated by capturing the screen 721 on which the encrypted character string is displayed before the biometric information of the user is input to the head-mounted display apparatus with enhanced security 100.

Accordingly, when the encrypted information is obtained from the image information generated by capturing the screen 721 on which the encrypted character string is displayed before the biometric information of the user is input to the head-mounted display apparatus with enhanced security 100, the encrypted information is stored in the memory of the head-mounted display apparatus with enhanced security 100. In addition, the encrypted information stored in the memory is not decrypted until the head-mounted display apparatus with enhanced security 100 receives the access privilege information from the user authentication server 500.

According to the exemplary embodiment of the present invention, the encrypted information may be obtained from the image information generated by capturing the screen 721 on which the encrypted character string is displayed after the head-mounted display apparatus with enhanced security 100 receives the access privilege information from the user authentication server 500. Accordingly, when the head-mounted display apparatus with enhanced security 100 receives the access privilege information from the user authentication server 500 and the encrypted information is obtained from the image information generated by capturing the screen 721 on which the encrypted character string is displayed, the encrypted information is stored in the memory, and the encrypted information stored in the memory is decrypted based on the access privilege information received from the user authentication server 500.

When the encrypted information is decrypted, the decrypted information is displayed on the display unit 120 of the head-mounted display apparatus with enhanced security 100.

As mentioned above, according to the system for accessing the encrypted information by using the head-mounted display apparatus with enhanced security and the external display apparatus 700, only the user wearing the head-mounted display apparatus with enhanced security 100 among a plurality of users can check the decrypted information of the encrypted information. Meanwhile, in the system for accessing the encrypted information by using the head-mounted display apparatus with enhanced security 100 and the external display apparatus 700, the decrypted information of the encrypted information may be different depending on the access privilege information received from the user authentication server 500, and the description thereof will be presented with reference to FIG. 5.

FIG. 5 is a configuration diagram of a system for accessing encrypted information by a head-mounted display apparatus with enhanced security according to an exemplary embodiment of the present invention.

As illustrated in FIG. 5, the system for accessing encrypted information by a head-mounted display apparatus with enhanced security includes first and second head-mounted display apparatuses with enhanced security 200 and 300, a user authentication server 500, and an external display apparatus 700.

According to the exemplary embodiment of the present invention, the first and second head-mounted display apparatuses with enhanced security 200 and 300 include decryption keys that can decrypt the encrypted information. Here, when the apparatuses 200 and 300 include different decryption keys from each other, decrypted information of the same encrypted information may be different from each other.

According to anther exemplary embodiment of the present invention, since the user authentication server 500 adds the different decryption keys depending on the user identified by the biometric information to the access privilege information, the decrypted information of the encrypted information may be different depending on the head-mounted display apparatus with enhanced security that has transmitted the biometric information.

Referring to FIG. 5, the encrypted character string may be included in the encrypted information of the external display apparatus 700, that is, the image information generated by capturing the screen 721 on which the encrypted character string is displayed, and the first and second head-mounted display apparatuses with enhanced security 200 and 300 recognize the same encrypted information from the image information by the OCR (Optical Character Recognition) process.

According to the exemplary embodiment of the present invention, the first and second head-mounted display apparatuses with enhanced security 200 and 300 include the decryption keys that can decrypt the encrypted information. Here, when the apparatuses 200 and 300 include the different decryption keys from each other, decrypted information 221 and 321 of the encrypted information may be different from each other.

According to another exemplary embodiment of the present invention, when the first and second head-mounted display apparatuses with enhanced security 200 and 300 receive the access privilege information including the same decryption key from the user authentication server 500, the decrypted information of the encrypted information are the same. However, since the user authentication server 500 adds the different decryption keys from each other depending on the user identified by the biometric information to the access privilege information, when the first and second head-mounted display apparatuses with enhanced security 200 and 300 respectively receive the access privilege information including the different decryption keys from each other from the user authentication server 500, the decrypted information 221 and 321 of the encrypted information may be different from each other.

Further, even when the first and second head-mounted display apparatuses with enhanced security 200 and 300 receive the same encrypted information from the information providing server, the user authentication server 500 may add the different decryption keys from each other depending on the user identified by the biometric information to the access privilege information, as stated above. When the first and second head-mounted display apparatuses with enhanced security 200 and 300 respectively receive the access privilege information including the different decryption keys from each other from the user authentication server 500, even though the same encrypted information is received, the decrypted information 221 and 321 of the encrypted information may be different from each other. Meanwhile, the encrypted information may belong to one of layers, and the information belonging to the different layers from each other depending on the authenticated user may be decrypted to be displayed. Accordingly, different information may be displayed depending on the user or security level of the information, so that it is possible to allow only the user to browse data requiring security.

Since the user authentication server 500 adds the different decryption keys from each other depending on the user identified by the biometric information to the access privilege information, when the decrypted information 221 and 321 of the encrypted information are different depending on the first and second head-mounted display apparatuses with enhanced security 200 and 300 that have transmitted the biometric information, the different information 221 and 321 can be displayed to users depending on the users wearing the head-mounted display apparatuses with enhanced security among a plurality of users, so that it is possible to allow the user to selectively access or partially access the encrypted information.

Figure 6:
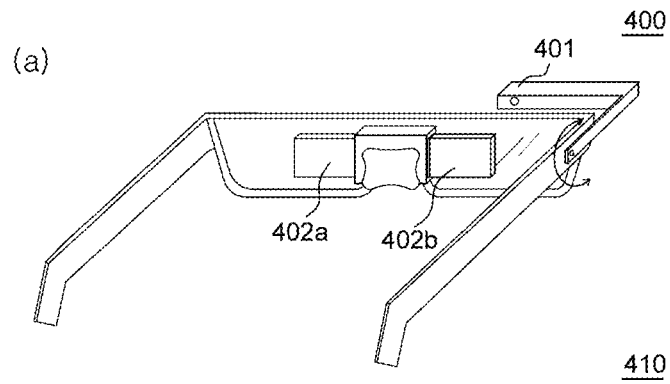
FIG. 6 illustrates schematic diagrams of head-mounted display apparatuses with enhanced security according to an exemplary embodiment of the present invention.
Figure 6:
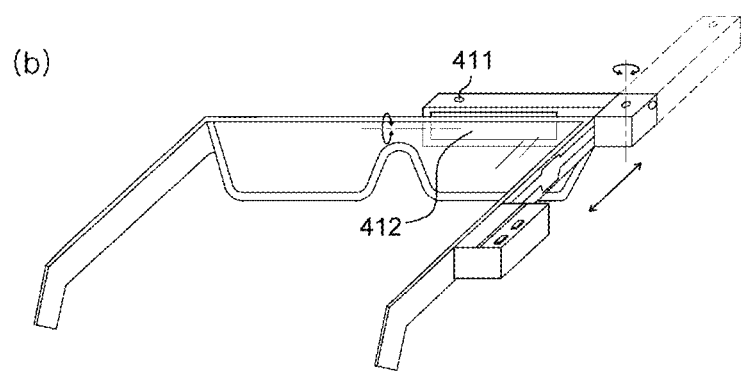
Figure 6:
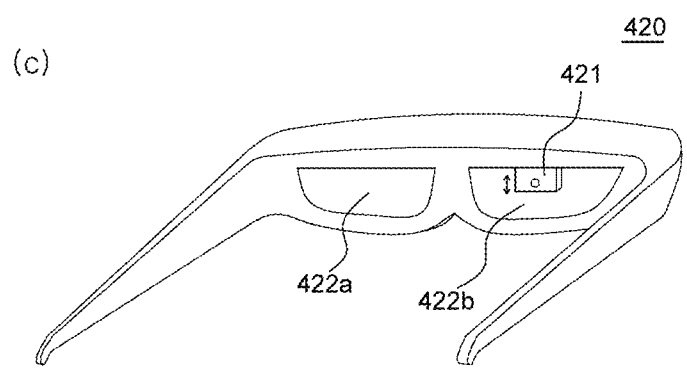
Figure 6:
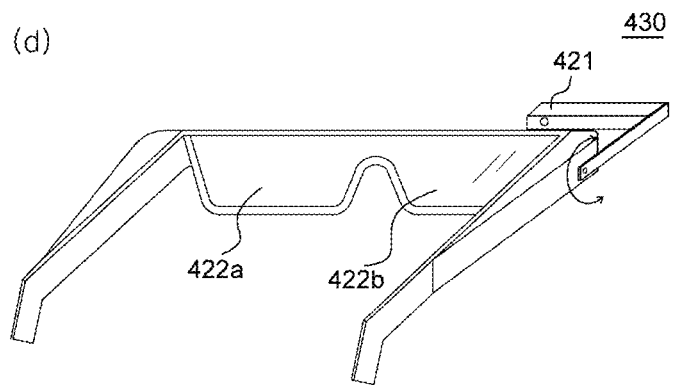

FIG. 6 is a schematic diagram illustrating head-mounted display apparatus with enhanced security according to an exemplary embodiment of the present invention.

(a) of FIG. 6 is another example of the head-mounted display apparatus with enhanced security according to the exemplary embodiment of the present invention, and illustrates a head-mounted display apparatus with enhanced security 400 provided with a display unit 402 positioned inside glasses. The head-mounted display apparatus with enhanced security 400 includes a biometric information input unit 401 and display units 402 (402a and 402b), and may further include a camera for capturing an encrypted screen displayed by an external display apparatus. The head-mounted display apparatus with enhanced security 400 decrypts information encrypted by a user authentication process by using the biometric information input through the biometric information input unit 401 and displays the decrypted information on the display unit 402. Meanwhile, since the display units 402a and 402b are positioned inside the glasses, the display unit 402 may be a transparent display unit in order to improve visibility of an external environment of the user. As illustrated in (a) of FIG. 6, when the biometric information input unit 401 is connected from the outside of the glasses so as not to obstruct a visual field of the user to receive the biometric information, the biometric information input unit 401 may rotate so as to face the eye of the user.

(b) of FIG. 6 is another example of the head-mounted display apparatus with enhanced security according to the exemplary embodiment of the present invention, and illustrates a head-mounted display apparatus with enhanced security 410 provided with a movable biometric information input unit 411 and a movable display unit 412. The head-mounted display apparatus with enhanced security 410 includes the biometric information input unit 411 and the display unit 412, and may further include a camera for capturing an encrypted screen displayed by an external display apparatus. As illustrated in (b) of FIG. 6, the head-mounted display apparatus with enhanced security 410 may be configured such that the biometric information input unit 411 and the display unit 412 move between an upper side and a side surface of the glasses or the biometric information input unit 411 is positioned at upper side of the display unit 412 to allow the biometric information input unit 411 and the display unit 412 to rotate, so that it is possible to secure the visual field of the user. Meanwhile, the biometric information input unit 411 is positioned on a lower side or an opposite side of the display unit 412 to allow the biometric information input unit 411 and the display unit 412 to rotate.

(c) of FIG. 6 is another example of the head-mounted display apparatus with enhanced security according to the exemplary embodiment of the present invention, and illustrates a closed-type head-mounted display apparatus with enhanced security 420. The closed-type head-mounted display apparatus with enhanced security 420 includes a biometric information input unit 421 and display units 422a and 422b, and may further include a camera for capturing an encrypted screen displayed by an external display apparatus. As illustrated in (c) of FIG. 6, the head-mounted display apparatus with enhanced security 420 can improve an operation processing ability and display resolution of the display units 422a and 422b instead of the visibility of the external environment of the user.

(d) of FIG. 6 is another example of the head-mounted display apparatus with enhanced security according to the exemplary embodiment of the present invention, and illustrates a see-through type head-mounted display apparatus with enhanced security 430. The head-mounted display apparatus with enhanced security 430 includes a biometric information input unit 431 and display units (432a and 432b), and may further include a camera for capturing an encrypted screen displayed by an external display apparatus. Meanwhile, in order for the display units 432a and 432b have the form of a lens of glasses, the display unit 432 may be a transparent and curved display. As illustrated in (d) of FIG. 6, when the biometric information input unit 431 is connected to the outside of the glasses so as not to obstruct a visual field of the user to receive the biometric information, the biometric information input unit 401 may rotate so as to face the eye of the user.

It should be understood that combinations of blocks of the block diagrams and steps of the flowcharts may be performed by computer program instructions. The computer program instructions may be mounted on general-purpose computers, specially-designed computers or a processor of other programmable data processing equipment. Accordingly, the instructions that are executed by the computers or the processor of other programmable data processing equipment generate means for executing the functions described in the blocks of the block diagrams and the steps of the flowcharts. The computer program instructions may also be stored in computer-available or computer-readable memory which can be used for a computer or other programmable data processing equipment in order to implement the functions in a specific way. Thus, the instructions stored in the computer-available or computer-readable memory may also include instruction means for performing the functions described in the blocks of the block diagrams and the steps of the flowcharts. The computer program instructions may also be mounted on the computer or other programmable data processing equipment. Thus, the instructions which operate the computer or the other programmable data processing equipment by generating a process executed by a computer through a series of operation steps that are performed on the computer or other programmable data processing equipment may also provide steps for executing the functions described in the blocks of the block diagrams and the steps of the flowcharts.

In the present specification, the respective block may illustrate parts of modules, segments or codes including at least one or more executable instructions for performing specific logic function(s). Moreover, it should be noted that the functions described in the blocks may be performed in different order in several modifications. For example, two successive blocks may be performed substantially at the same time, or may be performed in reverse order according to their functions.

The steps of a method or algorithm described in connection with the embodiments disclosed in the present specification may be embodied directly in hardware, in a software module executed by a processor, or in a combination of the two. The software module may reside in RAM memory, flash memory, ROM memory, EPROM memory, EEPROM memory, register, hard disk, a removable disk, a CD-ROM, or any other form of storage medium known in the art. An exemplary storage medium is coupled to the processor such that the processor can read information from, and write information to, the storage medium. Otherwise, the storage medium may be integrated with the processor. The processor and the storage medium may reside in an application-specific integrated circuit (ASIC). The ASIC may reside in a user terminal. Otherwise, the processor and the storage medium may reside as discrete components in a user terminal.

The present invention has been described in more detail with reference to the exemplary embodiments, but the present invention is not limited to the exemplary embodiments. It will be apparent to those skilled in the art that various modifications can be made without departing from the technical sprit of the invention. Accordingly, the exemplary embodiments disclosed in the present invention are used not to limit but to describe the technical spirit of the present invention, and the technical spirit of the present invention is not limited to the exemplary embodiments. Therefore, the exemplary embodiments described above are considered in all respects to be illustrative and not restrictive. The protection scope of the present invention must be interpreted by the appended claims and it should be interpreted that all technical spirits within a scope equivalent thereto are included in the appended claims of the present invention.

What is claimed is:

1. A head-mounted display apparatus with enhanced security, comprising:
    a biometric information input unit configured to receive biometric information of a user;
    a communication module configured to transmit information to a server or receive information from the server;
    a memory configured to store encrypted information including a plurality of layers;
    a processor configured to transmit the biometric information received through the biometric information input unit to a user authentication server through the communication module, receive access privilege information from the user authentication server, and decrypt the encrypted information stored in the memory based on the received access privilege information; and
    a display unit configured to display the decrypted information through the processor; and
    a camera configured to capture a scene, such that the scene is stored in the memory as image information, wherein the encrypted information is recognized from the image information,
    wherein the access privilege information comprises a user's description key and is different from each other depending on a security level of the user or the encrypted information, and
    wherein the decryption key is used for selectively decrypting the encrypted information to grant a partial access to the encrypted information in accordance with the security level and the processor is further configured to decrypt the encrypted information such that different layers of the encrypted information are displayed in accordance with the security level.

2. The head-mounted display apparatus of claim 1, wherein the encrypted information is received from an information providing server through the communication module.

3. The head-mounted display apparatus of claim 1, wherein the biometric information input unit is an iris camera that receives iris information of the user.

4. The head-mounted display apparatus of claim 1, wherein the biometric information input unit is positioned at an upper side of the display unit.

5. The head-mounted display apparatus of claim 1, wherein the biometric information received through the biometric information input unit is combined with unique identification information of the apparatus before being sent to the user authentication server for transmitting the access privilege information to the apparatus only in case it is determined as being an authenticated apparatus.

6. A method for accessing encrypted information by a head-mounted display apparatus with enhanced security, the method comprising:
    receiving biometric information of a user through a biometric information input unit;
    transmitting the biometric information received through the biometric information input unit to a user authentication server;
    receiving access privilege information from the user authentication server;
    storing a scene captured by a camera in the memory, as image information;
    decrypting encrypted information including a plurality of layers, stored in a memory based on the access privilege information, such that different layers of the encrypted information are displayed in accordance with the security level; and
    displaying the decrypted information of the encrypted information on a display unit,
    wherein the encrypted information is recognized from the image information to decrypt the recognized information,
    wherein the access privilege information comprises a user's description key and is different from each other depending on a security level of the user or the encrypted information, and
    wherein the decryption key is used for selectively decrypting the encrypted information to grant a partial access to the encrypted information in accordance with the security level.

7. The method of claim 6, wherein the encrypted information is received from an information providing server.

8. The method of claim 6, wherein the biometric information is iris information.

9. The method of claim 6, wherein in the decrypting, the encrypted information is selectively decrypted.

10. The method of claim 6, wherein the biometric information received through the biometric information input unit is combined with unique identification information of the apparatus before being sent to the user authentication server for transmitting the access privilege information to the apparatus only in case it is determined as being an authenticated apparatus.

* * * * *